Feb. 28, 1967 E. G. BLANZ 3,306,472
ADJUSTABLE GATE FOR BAR STOCK
Filed April 22, 1965 3 Sheets-Sheet 2
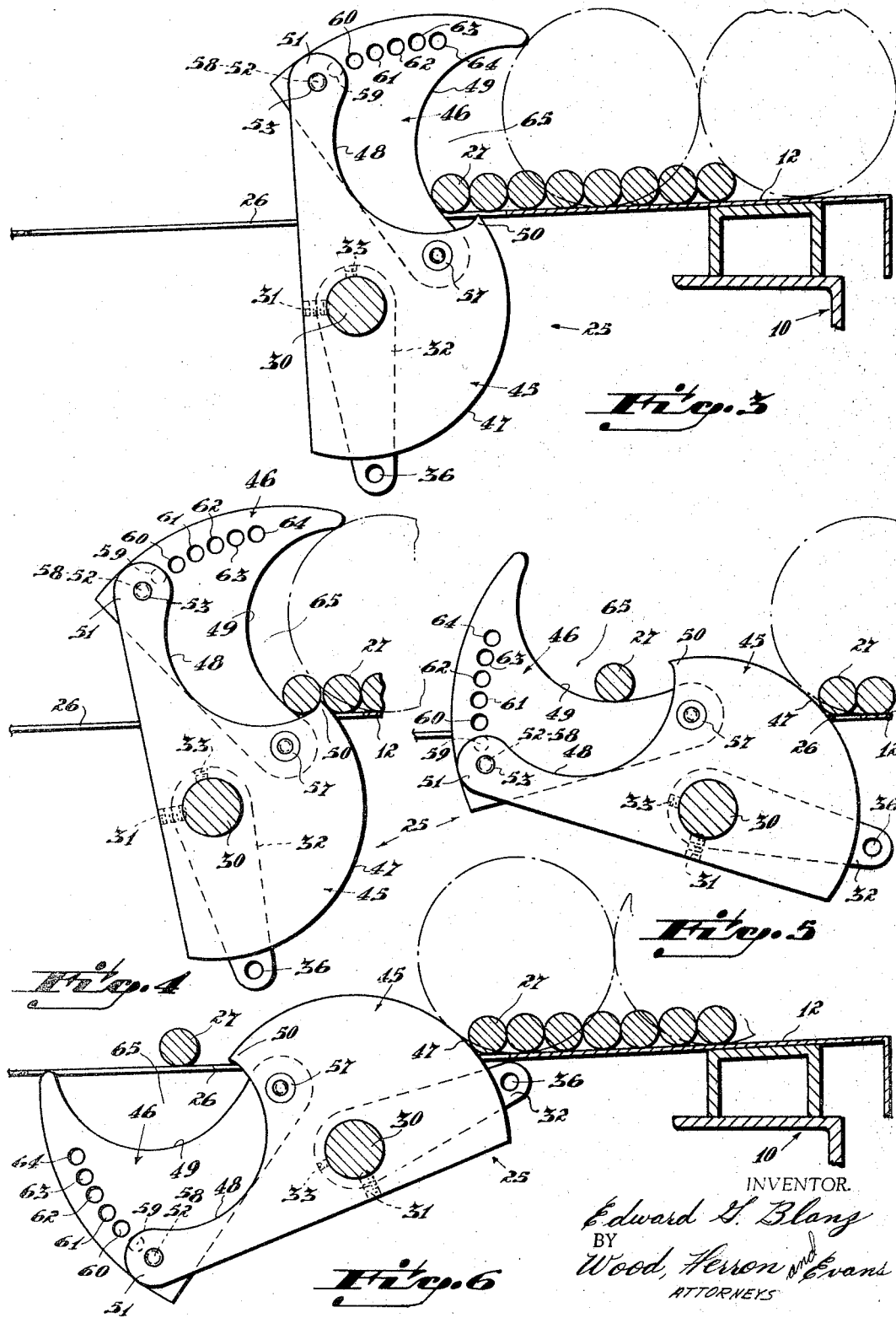
INVENTOR.
Edward G. Blanz
BY
Wood, Herron and Evans
ATTORNEYS

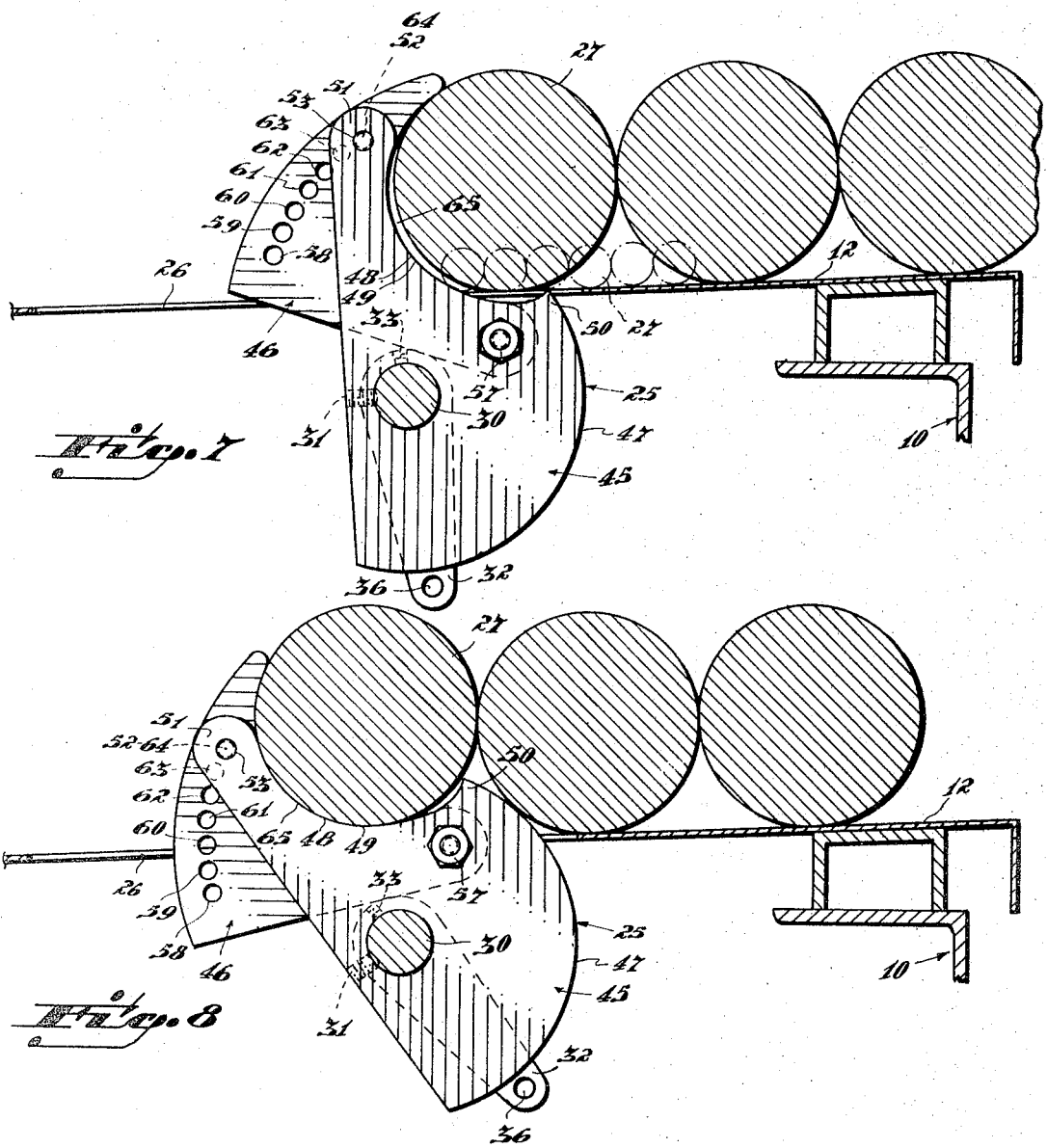

United States Patent Office 3,306,472
Patented Feb. 28, 1967

3,306,472
ADJUSTABLE GATE FOR BAR STOCK
Edward G. Blanz, Cincinnati, Ohio, assignor to Americraft Manufacturing Co., Cincinnati, Ohio, a partnership composed of Edward G. Blanz and Albert H. Blanz
Filed Apr. 22, 1965, Ser. No. 450,140
6 Claims. (Cl. 214—1)

This invention relates to a device for gating transversely moving bar stock, and more particularly the invention is directed to a gate which can be easily adjusted to change from the handling of one size bar stock to a different size, and to permit the stock to pass, one element at a time, by the gate.

The gate of my invention includes stop surface which partly defines a separating finger which is movable between positions above and below an inclined table upon which the bar stock is placed. The bars are free to roll down the table until they are restrained by the stop surface. The downstream side of the gate has a metering surface that is movable between positions above and below the inclined table. As the gate is pivoted to swing the separating finger below the table, the leading bar rolls into engagement with the metering surface. The gate is then pivoted in the opposite direction and a separating finger comes between a bar to be transported and the remaining bars. Rotation continues until the gate has reached its normal position dropping the metering surface below the table and redepositing the bar on the inclined table at the opposite side of the gate.

The invention contemplates the provision of two plates which are adjustable with respect to each other, one plate carrying the separating finger and the other carrying the metering surface. By adjusting the positions of the plates with respect to each other, the distance between the metering surface and separating finger can be varied to accommodate various sizes of bar stock.

Figure 1:
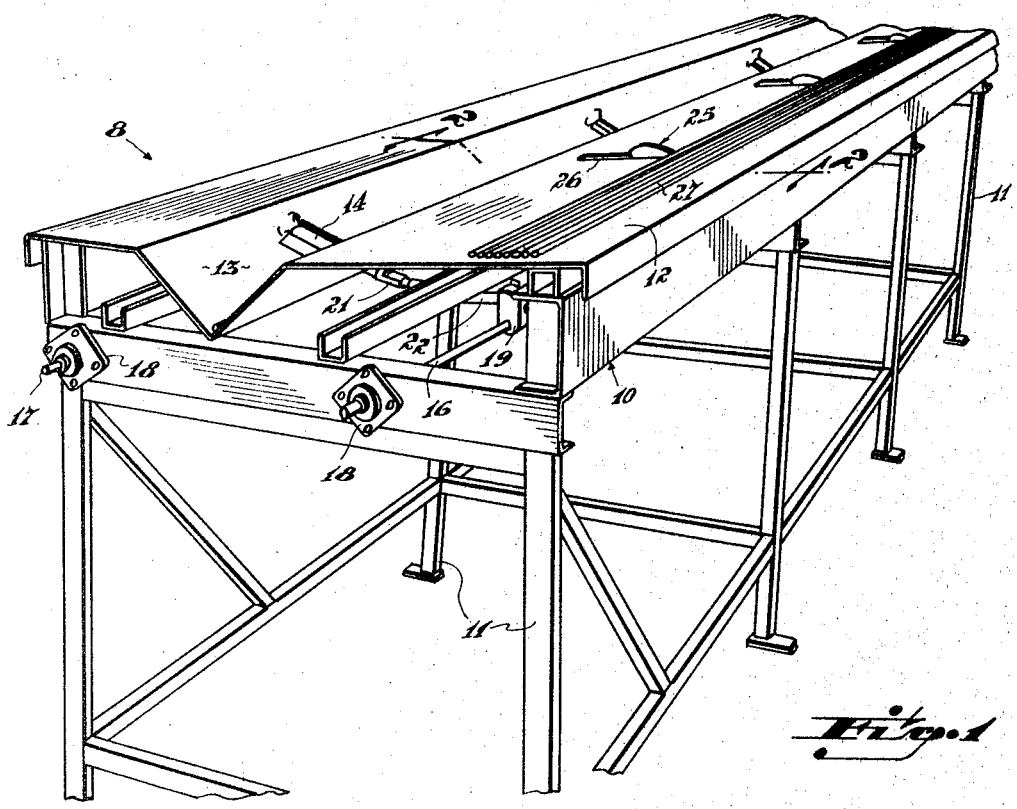
Figure 2:
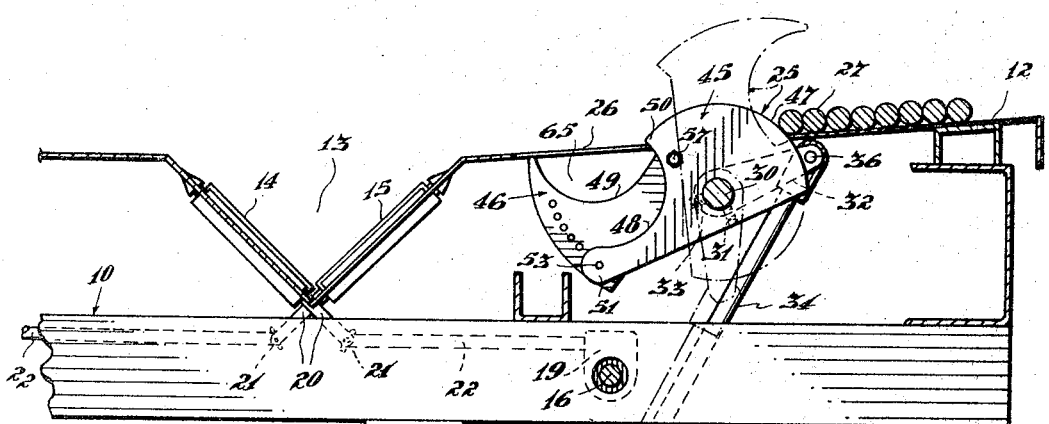

The invention can best be understood with a more complete description which is taken in conjunction with the following drawings, of which:

FIG. 1 is a perspective view of a trough conveyor, employing the gates constructed in accordance with the principles of my invention, FIG. 2 is a cross-sectional view taken along line 2—2 of FIG. 1, FIGS. 3 through 6 are cross-section views, similar to FIG. 2, showing the several operative positions of the gate when adjusted to accommodate small diameters of bar stock, and FIGS. 7 and 8 are similar cross-sectional views with the gate adjusted to accommodate large diameters of bar stock.

Referring to FIGS. 1 and 2, a table 8 having a trough conveyor is mounted on a frame 10 supported by a plurality of legs 11. It has as its upper surface an inclined table section 12 and a V-shaped trough 13. A plurality of drive rollers 14 and 15 are journaled in the walls of the trough 13 to convey a piece of bar stock longitudinally into or through further operating equipment (not shown).

The conveyor may be of any of a number of different types having any of a number of different uses. For example, the conveyor may carry the bar stock through inspection apparatus or to apparatus for further processing. It includes a pair of longitudinal drive shafts 16 and 17 which are journaled at their ends by bearing blocks 18 fixedly attached to the frame 10. A series of gear boxes 19 are spaced along the shafts 16 and 17 adjacent each drive roller 14 and 15 and are drivably connected to roller shafts 20 through universal joints 21 by transverse drive shafts 22. It can thus be seen that rotation of the drive shafts 16 and 17 will rotate the drive rollers 14 and 15 to convey a piece of bar longitudinally down the conveyor trough 13.

A plurality of gates 25 are pivotally supported below the surface of the table 8 and project above the inclined table section 12 through transverse slots 26 to permit bar stock 27 to roll, one at a time, down the inclined table 12 into the conveyor trough 13.

As shown in FIG. 2, the gates 25 are fixed on a shaft 30 by a set screw 31, the shaft 30 being journaled for rotation in bearing blocks on the frame 10. A lever arm 32 is fixed to the shaft 30 by a set screw 33. A piston rod 34 of air actuated cylinder 35 is pivotally connected as at 36 to the lever arm 32. The opposite end of the cylinder 35 is pivotally connected by a pin 37 to a bracket 38 which is fixed on the frame 10. On the illustrated embodiment, but not by way of a limitation, the cylinder 35 has a 5 inch stroke and the length of the lever arm 32 is 3¼ inches from the center of the pivotal connection to the center of shaft 30 so that the gate will swing through an arc of approximately 105°.

The gate 25 has two principal elements, namely a stop plate 45 and a transporting plate 46 that is adjustable with respect to the stop plate 45. The stop plate 45 has a convex stop surface 47 for restraining the pieces 27 of bar stock and a concave surface 48 cooperating with the transporting plate which has a concave metering surface 49. The abrupt change from convex surface 47 to concave surface 48 forms a separating finger 50. The concave surface 48 is terminated at 51 and has a threaded hole 52 therethrough to receive a threaded lock pin 53.

The transporting plate 46 is pivoted to stop plate 45 by a nut and bolt 57. A series of adjustment holes 58–64 are spaced on an arc having its center at the pivot bolt 57 and each is alignable with the threaded hole 52 so as to receive the lock bolt 53 and lock the plates 45 and 46 from shifting with respect to each other. The cooperating concave surface 48 and 49 of the stop plate and transporting plates respectively form a jaw opening 59 which captures a single bar to gate it to the conveyor trough. The size of the jaw 65 may be varied by pivoting the plates with respect to each other to accommodate various sizes of bar stock.

When the bolt 53 locks the plates in the condition illustrated in FIGS. 2 through 6, the gate is adjusted for small bars. The hole 64 at the opposite end of the series 58–64 is for the large bars and is illustrated at FIGS. 7 and 8 and the intermediate holes 59–63 are for the various sizes that range between the small and large illustrated in the drawings.

As has been indicated above, an objection of the invention has been to provide a gate permitting bar stock to move transversely, one element at a time, past the gate. Further, the gate is adapted to handle many different sizes of bar stock, only a minor adjustment in the gate being required to change from one size to a substantially different size. Three elements or surfaces are employed to perform the gating function. The convex surface 47 on the stop plate 45 blocks movement of the bar stock into the gate. This stopping function is illustrated in FIG. 6. The separating finger 50 picks one bar 27 from the incoming group and separates it from the group while the remainder of the stock is blocked from advancement by the stop surface 47. The metering surface 49 on transporting plate 46 limits the travel of the incoming stock as it passes over the separating finger 50.

The distance between the surface 49 and the separating finger 50 is sufficient to permit a single bar to move into engagement with the surface 49 with its line of contact with the conveyor table having passed the uppermost tip of the separating finger. Thus, when the gate is pivoted from the position of FIG. 3 to the position of FIG. 4 the separating finger 50 will engage the trailing side of the stock.

The gate as illustrated in FIGS. 3 to 6 is adjusted for gating small diameter stock. In those figures large diameter stock is shown in broken lines. It can be observed that the distance between the metering surface 49 and the separating finger 50 is not great enough to permit the large diameter stock to roll into the gate until the line of contact of the stock passes the finger 50. Therefore, when the gate pivots from the position of FIG. 3 to the position of FIG. 6 the finger 50 will not engage the trailing side of the large bar stock but will block its movement.

As indicated above, the gate is adjustable in order to accommodate the larger bar stock. The adjustment is made in a direction to increase the distance between the metering surface 49 and the separating finger 50 thus increasing the size of the jaw 65. When a full adjustment is made, the plates are in the condition illustrated in FIGS. 7 and 8. In that condition, the surface 49 blocks movement of the incoming stock only after the bar has reached a position in which its line of contact has passed over the separating finger 50. Thus, when the gate is pivoted from the position of FIG. 7 to that of FIG. 8 the separating finger engages the trailing side of the stock thereby permitting it to pass through the gate.

When the gate is in the condition of FIGS. 7 and 8, it is unsuitable for gating the small size stock. The distance between the surface 49 and the finger 50 is so great that more than one bar will pass over the finger 50 when the gate is in the position of FIG. 7. Note the smaller bars shown in broken lines in FIG. 7.

The operation of the gate can best be described by reference to FIGS. 2–6. When tubular bar stock 27 is placed on the inclined table 12, section gravity causes it to roll down into engagement with the convex stop surface 47 as shown at FIG. 2. Air from a source (not shown) is injected into the upper side of the cylinder 35 to pull the rod 34 downwardly and rotate the shaft 30 through 105°. Rotation of shaft 30 causes the gate to rotate to the position shown in phantom lines at FIG. 2 and more clearly shown in solid lines at FIG. 3.

A single bar will now roll into the jaw 65 and stop when it engages the metering surface 49 of the transporting plate 46. Air is now switched from the upper end of the cylinder 35 to the lower end pushing rod 34 out of the cylinder to effect rotation of the gate in an opposite direction thereby returning it to its normal position. As the gate starts to rotate, the finger 50 projects between the lowermost bar from the remaining bars (FIG. 4) so that only one bar can be transported over the gate while the remaining ones rest against the surface 47.

With its continued rotation toward the normal position, the bar nestles within the jaw 65 (FIG. 5) until the concave surface 49 drops below the inclined table section 12. As the plate 46 drops below the table 12, the bar is free to roll into the conveyor trough 13.

As can be readily seen in FIGS. 7 and 8, the operation is the same for larger sizes of bar stock. To adjust the gate to accommodate the size of bar stock to be conveyed, one need simply remove the lock pin 53, align the proper aperture 58–64 with threaded hole 52 and reinsert lock pin 53.

I claim:
1. A gate for bar stock moving on a table in a transverse direction comprising,
   a stop element pivoted to said table,
   a separating finger on said stop element movable between positions above and below the surface of said table,
   a transporting element adjustably mounted on said stop element, said transporting element presenting a rigid metering surface spaced downstream from said separating finger, said metering surface being movable between positions above and below the surface of said table,
   means for selectively varying the distance between said separating finger and said metering surface,
   and means for pivoting said elements with respect to said table to move said separating finger and metering surface between their respective positions.

2. A gate for bar stock moving on a table in a transverse direction comprising,
   a stop element pivoted to said table,
   a separating finger on said stop element movable between positions above and below the surface of said table,
   a transporting element pivotally mounted on said stop element, said transporting element presenting a metering surface spaced downstream from said separating finger, said metering surface being movable between positions above and below the surface of said table,
   adjustable means for selectively fixing the angular position of said transporting element with respect to said separating finger in one of a plurality of angular positions,
   and means for pivoting said elements with respect to said table to move said separating finger and metering surface between their respective positions.

3. A gate for bar stock moving on a table in a transverse direction comprising,
   a stop plate,
   means mounting said stop plate on a rod journaled to said table,
   a separating finger on said stop plate movable between positions above and below said table as said stop plate is pivoted,
   a transport plate pivoted on said stop plate, said transport plate having a metering surface spaced downstream from said separating finger,
   said metering surface being movable between positions above and below said table as said stop plate is pivoted,
   said transport plate having a plurality of spaced holes and said stop plate having a hole selectively alignable with any of the holes in said transport plate,
   a pin projectable through said aligned holes to fix said plates in a selected angular position with respect to each other thereby determining the distance between said separating finger and said metering surface,
   and a pneumatic piston and cylinder connected between said table and said stop plate for pivoting said stop plate.

4. A gate for bar stock moving on a table in a transverse direction comprising,
   a stop plate,
   means mounting said stop plate on a rod journaled to said table,
   a separating finger on said stop plate movable between positions above and below said table as said stop plate is pivoted,
   a transport plate pivoted on said stop plate, said transport plate having a metering surface spaced downstream from said separating finger,
   said metering surface being movable between positions above and below said table as said stop plate is pivoted,
   said transport plate having a plurality of spaced holes and said stop plate having a hole selectively alignable with any of the holes in said transport plate,
   a pin projectable through said aligned holes to fix said plates in a selected angular position with respect to each other thereby determining the distance between said separating finger and said metering surface,
   and means for pivoting said stop plate.

5. A gate for bar stock moving on a table in a transverse direction comprising,
   a stop plate, means pivoting said stop plate on said table,
a separating finger on said stop plate movable between positions above and below said table as said stop plate is pivoted,
a transport plate pivoted on said stop plate, said transport plate having a metering surface spaced downstream from said separating finger,
said metering surface being movable between positions above and below said table as said stop plate is pivoted,
said transport plate having a plurality of spaced holes and said stop plate having a hole selectively alignable with any of the holes in said transport plate,
a pin projectable through said aligned holes to fix said plates in a selected angular position with respect to each other thereby determining the distance between said separating finger and said metering surface.

6. A gate for bar stock moving on a table in a transverse direction comprising,
a stop plate,
means pivoting said stop plate on said table,
a separating finger on said stop plate movable between positions above and below said table as said stop plate is pivoted,
a transport plate pivoted on said stop plate, said transport plate having a metering surface spaced downstream from said separating finger,
said metering surface being movable between positions above and below said table as said stop plate is pivoted,
and means for fixing said plates in a selected angular position with respect to each other thereby determining the distance between said separating finger and said metering surface.

References Cited by the Examiner

UNITED STATES PATENTS

| | | | |
|---|---|---|---|
| 377,717 | 2/1888 | Kline | 214—1 X |
| 1,450,058 | 3/1923 | Allen | 221—241 |
| 1,927,847 | 9/1933 | Resser | 214—1 X |
| 2,260,643 | 10/1941 | Rosan | 221—295 X |

FOREIGN PATENTS

| | | |
|---|---|---|
| 1,156,745 | 11/1963 | Germany. |
| 616,143 | 1/1949 | Great Britain. |

MARVIN A. CHAMPION, *Primary Examiner.*